United States Patent [19]

Olinger et al.

[11] Patent Number: 4,772,482
[45] Date of Patent: Sep. 20, 1988

[54] HEAT STABILIZED DIPEPTIDE SWEETENING COMPOSITION AND METHOD

[75] Inventors: Philip M. Olinger; Alene F. Kradle, both of Savanna, Ill.

[73] Assignee: Finnish Sugar Company, Limited, Kantvik, Finland

[21] Appl. No.: 867,654

[22] Filed: May 27, 1986

[51] Int. Cl.$^4$ .............................................. A23L 1/236
[52] U.S. Cl. ...................................... 426/548; 426/549
[58] Field of Search ............... 426/548, 549, 552, 553, 426/554, 555

[56] References Cited

U.S. PATENT DOCUMENTS

| | | | |
|---|---|---|---|
| 3,285,751 | 11/1966 | Kracauer | 426/548 |
| 3,647,483 | 3/1972 | Eisenstadt | 426/548 |
| 3,658,553 | 4/1972 | Radlove | 426/554 |
| 3,684,529 | 8/1972 | Liggett | 426/548 |
| 3,875,311 | 4/1975 | Eisenstadt | 426/548 |
| 3,946,121 | 3/1976 | Eisenstadt | 426/548 |
| 4,185,127 | 1/1980 | Radlove | 426/554 |
| 4,277,504 | 7/1981 | Radlove | 426/555 |
| 4,556,565 | 3/1985 | Arima et al. | 426/548 |

*Primary Examiner*—Donald E. Czaja
*Assistant Examiner*—Carolyn Paden
*Attorney, Agent, or Firm*—Baker & McKenzie

[57] ABSTRACT

A relatively heat stable, intense sweetener composition that includes a dipeptide sweetener and a heat stabilizing amount of a sugar acid lactone. The sweetening composition may also include a polyhydric alcohol, preferably fructose. The sweetening composition exhibits a significant sweetness synergism.

Mixes for food products which include a sweetening agent comprising a dipeptide sweetener and a heat stabilizing amount of a sugar acid lactone, sometimes in combination with a polyhydric alcohol. These mixes can have reduced or low calories, and low sodium and cholesterol levels.

49 Claims, 1 Drawing Sheet

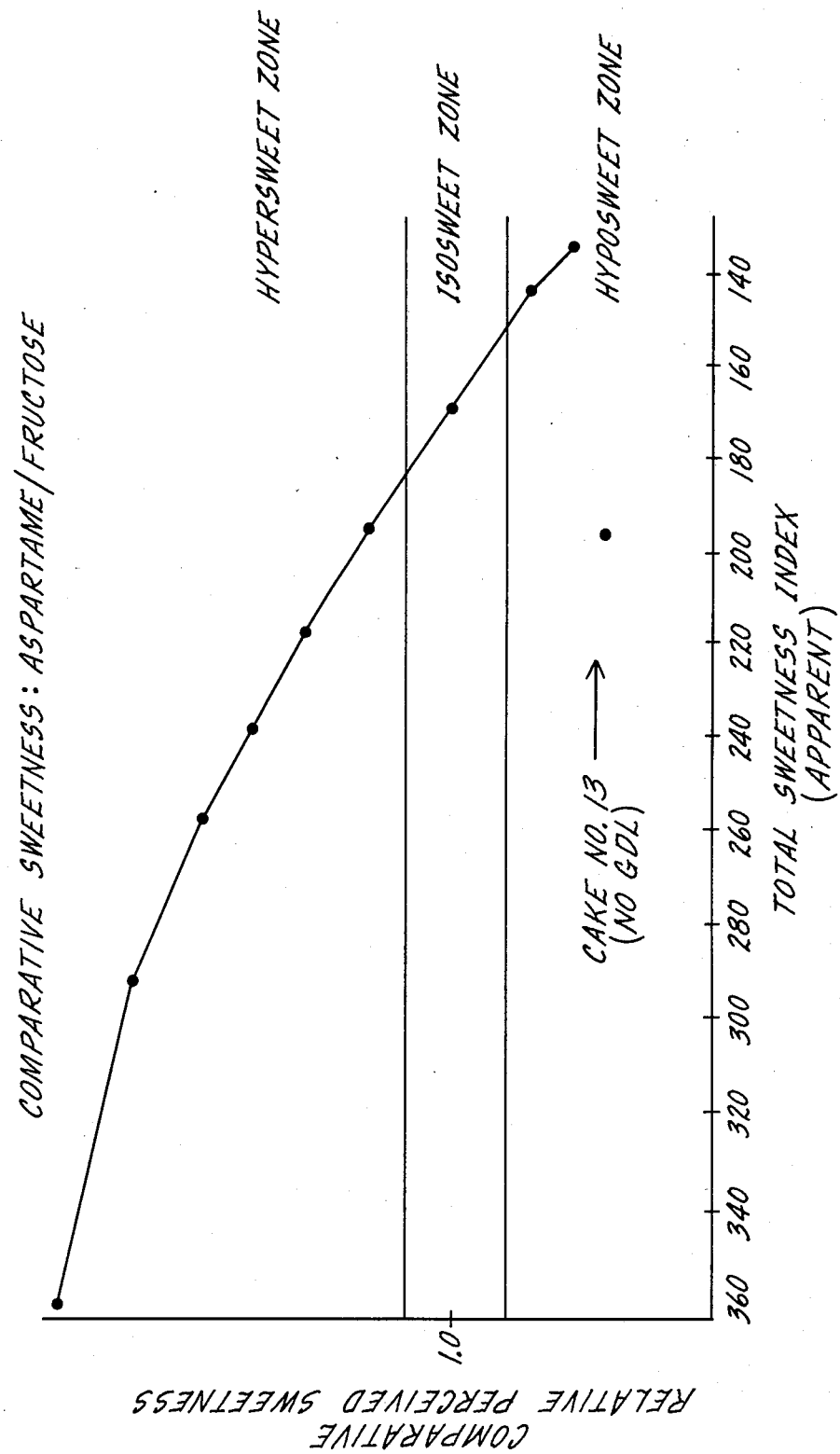

HEAT STABILIZED DIPEPTIDE SWEETENING COMPOSITION AND METHOD

TECHNICAL FIELD

This invention relates to the stabilization of dipeptide sweeteners at elevated temperatures. More particularly, this invention relates to the stabilization of the dipeptide sweetener aspartame by means of a sugar acid lactone, such as glucono delta lactone. In one specific aspect, the invention pertains to the use of aspartame as a sweetening agent in foods that have to be heated during preparation, e.g., baked goods.

BACKGROUND OF THE INVENTION

Dipeptide sweeteners, such as the L-aspartic acid derivatives, have received wide acceptance in many applications as an intense sweetener and sugar substitute. These dipeptide sweeteners are characterized by their intense sweetness and their clear initial sweet taste with a lack of any perceived unpleasant or objectionable aftertaste.

The dipeptide sweetener of choice is aspartame (1-methyl-N-L-$\alpha$-aspartyl-L-phenylalanine). Aspartame has been successfully used as a sweetener in a number of different applications—liquids, desserts, chewing gum—with no unpleasant or objectionable aftertaste. However, the use of aspartame has been heretofore limited to cold applications or brief moderately heated applications because of the instability of aspartame under elevated temperatures. When subjected to heat, aspartame may hydrolyze to the dipeptide aspartyl phenylalanine (AP) or be converted to diketopiperazine (DKP). DKP can further convert to AP and ultimately the AP converts into its constituent amino acids. AP, DKP and the amino acids produced upon decomposition are not sweet; therefore, the breakdown and/or conversion products of aspartame result in the loss of perceived sweetness.

For these reasons, aspartame has not—to date—been successfully used in applications where a relatively low calorie food product has to be heated, such as baked products. However, aspartame would be an attractive sweetener in these contexts, particularly in dietetic products which contain low or reduced calories. Other artificial sweeteners, e.g. sodium saccharin and calcium saccharin have been used in baked products thereby reducing caloric content, but these sweeteners produce unpleasant aftertastes.

Colliopoulas, et al., in European patent application No. 83106544.6 discloses an allegedly heat stable sweetening composition consisting of a dipeptide sweetener and a polyglucose or polymaltose. Although Colliopoulas et al. reports the increased stability of aspartame in baked applications, it does not refer to the eating quality of such products or to their caloric content, which are computed to be approximately 275 calories/100 g. cake or greater—not a reduced calorie cake.

Vaccarro, in U.S. Pat. No. 4,536,410, discloses a dipeptide sweetener composition which is allegedly heat stable. In Vaccarro, aspartame is combined with a lipid—by alternatively heating and cooling the mixture—to form a gel which is alleged to be thermally irreversible. Although Vaccarro reports, in Example 17, that a reduced calorie cake mix was produced using this gel, overall eating quality of the cake was not discussed. In addition, Example 17 discloses a cake which does not have low sodium or cholesterol levels.

Our invention, however, provides a composition and method well suited for making dietetic food products, such as a cake, as well as other food products. Dietetic products with acceptable taste, eating quality, sweetness, low or reduced caloric content, and low sodium and cholesterol levels can be readily produced.

SUMMARY OF THE INVENTION

The present invention contemplates a relatively heat stable, intense sweetener composition that includes a dipeptide sweetener and a heat stabilizing amount of a sugar acid lactone. Preferably the sugar acid lactone and the dipeptide sweetener are present in the sweetener composition in a dry weight ratio of about 2 to about 20, inclusive. The dipeptide sweetener of choice is aspartame and the sugar acid lactone of choice is glucono delta lactone.

The sweetening composition of the present invention may also include a polyhydric alcohol as a constituent to perform additional functions in food preparations, e.g. sweetening, bulking, softening, flavoring and the like. The polyhydric alcohol of choice is fructose, most preferable in the crystalline form. The use of fructose, aspartame and GDL in certain applications has resulted in a significant sweetness synergism, i.e., the end product demonstrated greater perceived sweetness than expected based on the amount of sweeteners added.

The present invention also contemplates a mix for food products. These products can have reduced or low caloric content, as well as acceptable taste, sweetness and overall eating quality. These mixes include a sweetening agent which comprises a dipeptide sweetener and a heat stabilizing amount of a sugar acid lactone, sometimes in combination with a polyhydric alcohol such as fructose (which serves other functions such as bulking and contributes to a synergistic sweetening effect), flour, a leavening agent and bulking agents. Such dietetic mixes are further characterized as having low sodium and cholesterol levels.

In a method aspect, the present invention provides a means for imparting enhanced heat stability for a dipeptide sweetener by combining said sweetener with a heat stabilizing amount of a sugar acid lactone such as glucono delta lactone. This enhanced stability is also maintained in the presence of a polyhydric alcohol.

In another method aspect, the present invention provides a means for making a dietetic cake which has low calories and low sodium and cholesterol levels, yet has acceptable taste, sweetness and overall eating quality.

BRIEF DESCRIPTION OF THE DRAWING

In the drawing, the sole FIGURE graphically depicts the comparative relative sweetness of cakes sweetened with aspartame and fructose in decreasing amounts and leavened with GDL versus the apparent Total Sweetness Index for each cake.

DETAILED DESCRIPTION OF THE PREFERRED EMBODIMENTS

A. General

The principal ingredients of the present heat-stabilized sweetening compositions are a dipeptide sweetener and a sugar acid lactone. Such sweetening compositions are particularly well-suited for use with food products that are subjected to elevated temperatures.

Among the dipeptide sweeteners contemplated for the present compositions are the L-aspartic acid derivatives of the type disclosed in U.S. Pat. Nos. 3,475,403 (Mazur et al.); 3,492,131 (Schlatter); 4,029,701 (Haas et al.); 4,517,214 (Shoaf et al.); and 4,554,167 (Surge et al.). The preferred dipeptide sweeteners for the present purposes are the aspartyl phenylalanine alkyl esters containing up to four carbon atoms, inclusive, in the alkyl moiety thereof. The dipeptide sweetener which is particularly preferred is aspartame (1-methyl-N-L-α-aspartyl-L-phenylalanine).

The sugar acid lactones suitable as heat stabilizing agents ar pro-acids that hydrolyze at elevated temperatures to provide an additional carboxylic acid moiety.

As such, the sugar acid lactone not only provides a heat stabilizing function for the dipeptide sweetener but may also be utilized as an acidulant. Illustrative of these heat-stabilizing sugar acid lactones are glucono delta lactone, L-gulono-lactone, glucoheptono-1,4 lactone, and the like.

Glucono delta lactone is the preferred heat stabilizing agent for the purposes of the present invention.

Preferably, the sugar acid lactone and the dipeptide sweetener are present in a dry weight ratio of about 2 to about 20. In the context of a baked cake, the preferred dry ratio is in the range of about 2 to about 17, with a dry weight ratio of sugar acid lactone to dipeptide sweetener of about 6.5 to about 7.5 being particularly preferred. The foregoing weight ratios are stated on a dry weight basis.

In certain food product applications, such as baked foods, a physiologically acceptable polyhydric alcohol can be used in conjunction with the foregoing heat-stabilized compositions. Because full calorie sweeteners in a baked food product context usually act as bulking and softening agents as well as sweetening agents, the replacement of a full calorie sweetener with an intense sweetener, such as a dipeptide sweetener, may result in relatively poor eating quality of the final product. However, it has now been found that a polyhydric alcohol, such as fructose, not only can be utilized as a bulking agent but also that the combination of a heat-stabilized sweetening composition of this invention with a polyhydric alcohol provides a synergistic sweetening effect insofar as the perceived sweetness is greater than expected based on the amount of sweetener added.

Suitable polyhydric alcohols that can be used together with the heat-stabilized sweetening compositions of the present invention are those having a relative sweetness, as compared to sucrose of at least 0.3. Illustrative examples are the ketoses such as fructose, as well as sucrose, xylitol, and the like.

The polyhydric alcohol of choice is fructose. Although sucrose is widely used as a natural sweetener, it has many metabolic drawbacks. Consumption of sucrose can produce extreme "highs" and "lows" in blood sugar levels which are considered by many experts to be risk factors in the development of heart disease, arteriosclerosis and hypoglycemia (low blood sugar). Fructose, on the other hand, provides many advantages vis-a-vis sucrose.

Fructose is the sweetest natural sugar known. Depending on application temperature, time and pH, fructose can range from approximately 1.0 to approximately 1.7 times sweeter than sucrose, meaning that less fructose may be required to achieve desired sweetness levels, resulting in a corresponding decrease in calories.

Fructose also has many metabolic advantages. For example, fructose enters the bloodstream at a relatively slow rate due to fructose's absorption and metabolization in the liver. In addition, fructose creates 3 to 5 times lower increases in blood sugar and insulin levels than sucrose, dextrose and honey. Moreover, fructose aids in maintaining blood sugar and insulin levels within their normal limits. The consumption of foods that raise blood insulin levels and cause excessive fluctuation in blood sugar may lead to quick return of hunger pangs and to problems with weight control; fructose—because it is released into the blood stream slowly and evenly over an extended period of time—controls hunger naturally.

The sweetening composition of the present invention—which utilizes a sugar acid lactone—when used in a baked food product can also perform a leavening function because the sugar acid lactone upon hydrolysis contributes to the leavening. Accordingly, use of a "double action" baking powder may not be necessary. This results in a baked product with relatively low sodium content.

The relative amounts of the sugar acid lactone and the polyhydric alcohol—if one is present—can vary over a relatively wide range depending on the particular product to be sweetened. In particular, the sugar acid lactone and polyhydric alcohol can be present in a dry weight ratio of about 0.03 to about 0.15. In a cake context, the more preferred ratio is about 0.06 to about 0.1.

The relative amount of the polyhydric alcohol and the dipeptide sweetener will also vary depending on the application involved and the sweetness equivalent of the polyhydric alcohol. The polyhydric alcohol (if fructose) and dipeptide sweetener preferably can be present in a weight ratio of about 115 to about 220. In a cake context, a particularly preferred weight ratio of polyhydric alcohol:dipeptide sweetener is in the range of about 115 to about 185. A more preferred weight ratio is the range of about 130 to about 160. In a cookie context, a particularly preferred weight ratio range is about 200 to about 220, with a more preferred weight ratio being about 215.

Experimental

The sweetening compositions of the present invention, in one aspect, provide a low calorie, dietetic cake with the same perceived sweetness as a cake sweetened by full calorie sweeteners. Formulations previously developed for one-third calorie reduced/no sodium added white, yellow, lemon and chocolate cakes sweetened solely with crystalline fructose are set forth in Table I, below. The white, yellow and lemon cakes provided about 250 calories per 100 grams of baked cake (chocolate cake 245 calories per 100 g.). Each cake was observed to have qualities of good rise, texture, mouthfeel and taste. The sweetness level of each cake was judged to be acceptable.

TABLE I

| | Cakes Sweetened with Fructose: Low Sodium | | | | | | | |
|---|---|---|---|---|---|---|---|---|
| | White | | Yellow | | Lemon | | Chocolate | |
| | grams | percent | grams | percent | grams | percent | grams | percent |
| Pure Crystalline Fructose | 222.2 | 47.45 | 223.0 | 47.44 | 223.0 | 47.45 | 215.5 | 44.71 |
| High Ratio Bleached Cake Flour | 182.2 | 38.91 | 182.2 | 38.91 | 182.8 | 38.90 | 181.1 | 37.57 |
| N-Flate (National Starch) | 36.2 | 7.73 | 36.3 | 7.72 | 36.3 | 7.72 | 36.1 | 7.49 |
| Egg White Solids (Henningsen, P-20) | 16.2 | 3.46 | 16.3 | 3.47 | 16.3 | 3.47 | 16.1 | 3.34 |
| Vanilla Powder (Givaudan FD-9993) | 2.7 | 0.58 | 2.7 | 0.57 | 1.0 | 0.21 | 2.7 | 0.56 |
| Potassium Bicarbonate | 2.8 | 0.60 | 2.8 | 0.60 | 2.8 | 0.60 | 4.4 | 0.91 |
| Glucono Delta Lactone (Finnish Sugar) | 6.0 | 1.28 | 6.0 | 1.28 | 6.0 | 1.28 | 4.1 | 0.85 |
| Roche Beta Carotene Beadlets, 10% | — | — | 0.075 | 0.016 | 0.075 | 0.016 | — | — |
| Lemon Pentarome (MCP) | — | — | — | — | 1.7 | 0.36 | — | — |
| Cocoa (DeZaan 11SB) | — | — | — | — | — | — | 20.0 | 4.15 |
| Potassium Carbonate | — | — | — | — | — | — | 2.0 | 0.41 |
| Water | 312.0 | — | 312.0 | — | 312.0 | — | 312.0 | — |
| Theoretical Sweetness Index | 333.3 | — | 334.5 | — | 334.5 | — | 323.25 | — |

Directions: Combine dry ingredients. Whip at low speed for 30 seconds. Add water. Continue whipping at low speed for 30 seconds then at high speed for 5 minutes. Transfer batter to lightly greased floured 9¼" × 13¼" rectangular (or two 9-inch round) cake pan. Bake at 325° F. for about 32 minutes (about 28 minutes for round pans).
N-Flate: balanced blend of emulsifiers, modified foodstarch and guar gum The cakes were extremely low in sodium content because of the absence of added salt and the use of a single action leavening system consisting of glucono delta lactone as the acidulant and potassium bicarbonate as the carbon dioxide source. The chocolate cake was supplemented with potassium carbonate to increase batter pH and enhance the chocolate flavor.

The GDL and $KHCO_3$ represent respectively 1.28% and 0.60% of the white, yellow and lemon formulations on a dry basis. The ratio of GDL:$KHCO_3$ was 2.13; the ratio of fructose:GDL in the white, yellow and lemon cakes was about 37.2.

Each of the cakes listed in Table I were sweetened with the polyhydric alcohol fructose ($C_6H_{10}O_6$) and had theoretical Sweetness Indices of 333.3 (white), 334.5 (yellow and lemon) and 323.25 (chocolate).

The Sweetness Index is calculated by multiplying the grams of sweetener by the sweetness equivalent of the sweetener (vis-a-vis sucrose). Fructose is one and a half times as sweet as sucrose, so its sweetness equivalent is 1.5.

The white cake in Table I was used as the base point of our development of a cake with low calories in which about half of the sweetness was derived from a dipeptide sweetener, such as aspartame, and the remainder was derived from fructose. A further objective of our research was to develop cakes (either sweetened solely with aspartame or sweetened with fructose and aspartame in combination) with a perceived sweetness similar to the white cake in Table I (sweetened solely by crystalline fructose).

As noted, the white cake in Table I had a Sweetness Index of 333.3. For purposes of our research, we increased the fructose to 223 grams and assigned a Sweetness Index of 334, this cake was used as the control. See Table II reproduced below, column 1.

TABLE II

| | Development of Sweetener Levels Aspartame/Fructose | | | | | | | | | | | | |
|---|---|---|---|---|---|---|---|---|---|---|---|---|---|
| | White Cake, grams | | | | | | | | | | | | |
| | 1 | 2 | 3 | 4 | 5 | 6 | 7 | 8 | 9 | 10 | 11 | 12 | 13 |
| Aspartame | — | 0.96 | 0.70 | 0.70 | 0.60 | 0.60 | 0.50 | 0.50 | 0.40 | 0.35 | 0.30 | 0.40 | 0.50 |
| Pure Crystalline Fructose | 223.0 | 111.5 | 100.0 | 86.0 | 90.0 | 80.0 | 80.0 | 65.0 | 60.0 | 55.0 | 55.0 | 60.0 | 65.0 |
| High Ratio Bleached Cake Flour | 183.0 | 183.0 | 183.0 | 183.0 | 183.0 | 183.0 | 183.0 | 184.0 | 240.0 | 219.0 | 219.0 | 195.0 | 183.0 |
| N-Flate | 36.3 | 36.3 | 36.3 | 36.3 | 36.3 | 36.3 | 36.3 | 36.3 | 36.3 | 43.0 | 43.0 | 38.8 | 36.3 |
| Egg White Solids | 16.3 | 16.3 | 16.3 | 16.3 | 16.3 | 16.3 | 16.3 | 16.3 | 16.3 | 20.3 | 20.3 | 20.3 | 16.3 |
| Glucono Delta Lactose | 6.0 | 6.0 | 6.0 | 6.0 | 6.0 | 6.0 | 6.0 | 6.0 | 6.0 | 6.0 | 6.0 | 4.0 | — |
| Potassium Bicarbonate | 2.8 | 2.8 | 2.8 | 2.8 | 2.8 | 2.8 | 2.8 | 2.8 | 2.8 | 2.8 | 2.8 | 2.8 | — |
| Vanilla Powder | 2.7 | 2.7 | 2.7 | 2.7 | 2.7 | 2.7 | 2. | 2.7 | 2.7 | 2.7 | 2.7 | 2.7 | 2.7 |
| Polydextrose | — | 69.7 | 77.0 | 85.8 | 83.3 | 89.6 | 89.6 | 99.0 | 60.0 | 70.0 | 70.0 | 80.0 | 99.0 |
| Solka Floc | — | 40.8 | 45.0 | 50.2 | 48.7 | 52.4 | 52.4 | 58.0 | 45.0 | 51.0 | 51.0 | 63.6 | 58.0 |
| Double Action Baking Powder | — | — | — | — | — | — | — | — | — | — | — | — | 8.8 |
| Water | 310.0 | 310.0 | 310.0 | 310.0 | 310.0 | 310.0 | 310.0 | 310.0 | 310.0 | 310.0 | 310.0 | 170.0 | 310.0 |
| Sweetness: Aspartame × 200 | — | 192 | 140 | 140 | 120 | 120 | 100 | 100 | 80 | 70 | 60 | 80 | 100 |
| Sweetness: Fructose × 1.5 | 334 | 167 | 150 | 129 | 135 | 120 | 120 | 98 | 90 | 82 | 82 | 90 | 98 |
| Total Sweetness Index (apparent) | 334 | 359 | 290 | 269 | 255 | 240 | 220 | 198 | 170 | 152 | 142 | 170 | 198 |
| Ratio GDL:Aspartame | — | 6.25 | 8.57 | 8.57 | 10.00 | 10.00 | 12.00 | 12.00 | 15.00 | 17.14 | 20.00 | 10 | — |
| Perceived Relative Sweetness | c | (+) | (+) | (+) | (+) | (+) | (+) | (+) to I | I | I to (−) | (−) | I | (−) |

Key: c = control; (+) = hypersweet vs. control; I = isosweet to control; (−) = hyposweet vs. control N-Flate: balanced blend of emulsifiers, modified foodstarch and guar gum Column 2 sets forth a cake composition which duplicates the theoretical Sweetness Index of te control: we derived the mixture by calculating the theoretical amount of fractose and aspartame necessary to reach a Sweetness Index of 334. Our calculations were as follows.

The theoretical amount of fructose required for a 50% fructose sweetened cake is [334 (target index)÷2]÷1.5 (fructose sweetness equivalent) =111.3 grams. We used 111.5 grams in the cake set out in column 2. The theoretical amount of aspartame required for a 50% aspartame sweetened cake is: [334 (target index)÷2]÷200 (aspartame sweetness equivalent)÷0.87 (estimated loss of 13% during baking)=approximately 0.96 grams. In order to replace the fructose deleted from the control, we added 110.54 grams of bulking agent [223−(111.5+0.96)]. We used 69.7 grams polydextrose and 40.8 grams of powdered cellulose fiber (Solka-Floc) as the added bulking agents.

Cake No. 2 was observed to have acceptable rise and texture with an apparent Total Sweetness Index of 359 (assuming no loss of aspartame during baking). However, the cake was far too sweet (hypersweet) based on organoleptic comparison to the control cake.

In Cakes Nos. 3-7 (columns 3-7, Table II) we decreased the aspartame and fructose amounts and correspondingly increased the bulking agents. Each cake was observed to have acceptable rise and texture, but was extremely sweet or too sweet based on an organoleptic comparison to the control. The apparent Sweetness Indices ranged from 290-220.

In Cake No. 8 (column 8, Table II), we further reduced the fructose and aspartame levels (0.5 grams aspartame, 65 grams fructose), and increased the total bulking agents (polydextrose: 99 grams, Solka-Floc: 58 grams). This mix produced a cake which was observed to have acceptable rise and moderate texture and an apparent Total Sweetness Index of 198. In organoleptic comparison to the control, Cake No. 8 was judged to be slightly sweeter to about isosweet.

In Cake No. 9 (column 9, Table II) we reduced the aspartame (0.4 grams) and fructose (60 grams) further, and adjusted the flour and bulking agent levels. We added more flour because large quantities of bulking agents have a detrimental effect on the overall eating quality of the cakes. The cake, with an apparent Sweetness Index of 17 was organoleptically judged to be about isosweet compared to the control.

In Cakes Nos. 10 and 11 (columns 10 and 11, Table II) we reduced the aspartame and fructose levels further. The resulting cakes were observed to have acceptable rise and moderate texture, but when organoleptically compared to the control, were judged to be about isosweet to less sweet (hyposweet), and again less sweet (hyposweet), respectively.

In Cake No. 12 (Column 12, Table II) we used 0.40 grams aspartame and 60 grams of fructose to create a cake with an apparent Total Sweetness Index of 170, the same as Cake No. 9. We reduced the amount of GDL to 4.0 grams. The resulting cake was observed to have good rise and texture and was organoleptically judged to be about isosweet to the control.

The preferred percentages of aspartame and fructose expressed as a dry basis percentage of the batter weight to produce an approximately isosweet cake vis-a-vis the control cake are in the range of about 0.074% to about 0.106% for aspartame and about 11.70% to about 13.84% for fructose. The aspartame and fructose levels of Cake No. 9 (0.085% and 12.78%, respectively) produced a cake judged to be about isosweet to the control.

The total apparent Sweetness Indices of Cake No. 9 and Cake No. 12 were calculated as 170, which is about one-half that of the Total Sweetness Index of the control—334. This demonstrates that the combination of fructose and aspartame as the sweetening system created a significant sweetness synergism in the context of the cake.

Our further research disclosed that the GDL leavening system also plays a significant role in the observed fructose/aspartame synergism. We prepared Cake No. 13 (column 13, Table II) using commercially available double action baking powder instead of GDL/KHCO$_3$; in all other respects Cake 13 was similar to Cake No. 8 (column 8, Table II). The double action baking powder is a balanced blend of sodium bicarbonate, sodium aluminum sulfate, corn starch, calcium sulfate, calcium acid phosphate and calcium silicate. Cake No. 13 was observed to have acceptable rise and moderate texture, but was judged to be noticeably less sweet than Cake No. 8 and the control (Cake No. 1). This demonstrated that GDL is involved, in part, in the perceived sweetness synergism as well.

The preferred weight ratios of GDL:fructose and GDL: aspartame, based upon dry weight, in a batter composition with respect to isosweetness are in the range of about 0.06 to about 0.1 (GDL:fructose) and about 8 to about 17 (GDL:aspartame).

The FIGURE graphically depicts the comparative relative perceived sweetness (compared to the fructose sweetened control cake) of those cakes set forth in Table II versus the apparent total Sweetness Indices.

A further objective of our work was to develop a low calorie cake utilizing aspartame as the sole sweetener. To that end, an aspartame sweetened cake was developed which had a perceived sweetness similar to the perceived sweetness of the white cake found in Table I which was sweetened solely by crystallin fructose. Table III, below summarizes our formulations for cakes sweetened solely with aspartame.

TABLE III

Development of Sweetener Level Aspartame

| | White Cake, grams | | | | |
|---|---|---|---|---|---|
| | 1 | 2 | 3 | 4 | 5 |
| Aspartame | 1.50 | 1.20 | 0.90 | 0.80 | 0.90 |
| High Ratio Bleached Cake Flour | 198.5 | 198.8 | 199.0 | 199.0 | 199.0 |
| N-Flate | 40.0 | 40.0 | 40.0 | 40.0 | 40.0 |
| Egg White Solids | 20.3 | 20.3 | 20.3 | 20.3 | 20.3 |
| Glucono Delta Lactose | 6.0 | 6.0 | 6.0 | 6.0 | — |
| Potassium Bicarbonate | 2.8 | 2.8 | 2.8 | 2.8 | — |
| Vanilla Powder | 2.7 | 2.7 | 2.7 | 2.7 | 2.7 |
| Polydextrose | 125.0 | 125.0 | 125.0 | 125.8 | 125.0 |
| Solka Floc | 73.2 | 73.2 | 73.2 | 73.2 | 73.2 |
| Double Action Baking Powder | — | — | — | — | 8.8 |
| Water | 350.0 | 350.0 | 350.0 | 350.0 | 350.0 |
| Apparent Total Sweetness Index (Sweetness: Aspartame × 200) | 300 | 240 | 180 | 160 | 180 |
| Ratio GDL:Aspartame | 4.00 | 5.00 | 6.67 | 7.50 | — |
| Perceived Relative Sweetness | (+) | (+) | ~I | I to (−) | (−) |

Key: (+) = hypersweet vs. fructose cake control (334); I = isosweet to control; (−) = hyposweet vs. control Cakes Nos. 1 and 2 (found in columns 1 and 2 of Table III) were observed to have acceptable rise and moderate texture, but were judged to be hypersweet when organoleptically compared to the fructose sweetened control (set forth in column 1 of Table II). Cake No. 3, with an apparent Total Sweetness Index of 180, was judged to be about isosweet when compared organoleptically to the control, and had acceptable rise and moderate texture. Cake No. 4 with an apparent Total Sweetness Index of 160 was judged to be about isosweet to hyposweet (less sweet) when compared organoleptically to the control, but we noted acceptable rise and moderate texture.

These results also demonstrate a significant sweetness synergism. In particular, the data indicate that the aspartame-sweetened cake system of Cake No. 3 is about twice as sweet as could be expected based upon the added sweetener.

Cake No. 5 shows that glucono delta lactone has a significant role in the observed synergism as well. Cake No. 5 was identical to Cake No. 3 in all respects except for the substitution of double action baking powder for the glucono delta lactone/potassium bicarbonate leavening system. Cake No. 5 exhibited good rise and moderate texture, but was judged to be noticeably less sweet than Cake No. 3 and the control. The presence of GDL, therefore, contributes to the synergism observed in the other cakes sweetened only with aspartame.

With respect to a solely aspartame sweetened cake, the preferred percentage of aspartame expressed as a dry basis percentage of the batter weight and the preferred ratio of GDL:aspartame to produce an approximately isosweet cake are about 0.17% to about 0.19% and about 6.67 to about 7.53 respectively. The GDL/aspartame sweetness synergism can be extended to other GDL/aspartame ratios as indicated by the sweetness synergism noted for Cake No. 1 (column 1, Table III), where the weight ratio of GDL:aspartame was 3.99 based upon dry weight.

Besides the synergism noted with respect to sweetness, our research also indicates that GDL plays a significant role in stabilizing aspartame during exposure to elevated temperatures. We performed high performance liquid chromatographic (HPLC) analysis of cakes baked with and without GDL. The results of this analysis support the role of GDL in stabilizing aspartame.

The cakes were blended and baked in rectangular pans according to the directions set forth in Table I. As such, the baking time was approximately 32 minutes at about 325° F. The baked cakes were allowed to cool to room temperature and a 10-gram sample of each cake was randomly selected and combined in a Waring blender with 100 ml of HPLC mobile phase and blended for 5 minutes. The blended sample was filtered and diluted to a concentration of about 10 to 20 ug/ml. The prepared samples were analyzed according to the following HPLC conditions: column, Waters Associate u Bondapak C-18; mobile phase, 10% acetonitrile in 0.0125 M dibasic potassium phosphate at pH 3.5; flow rate, 0.8 ml/min; injection volume, 20 ul; detection, UV at 214 nm. Under these conditions the absolute retention times for phenylalanine, aspartylphenylalanine, diketopiperazine and aspartame were about 5.2, 6.3 and 10.1 and 19.8 minutes respectively.

TABLE IV

Aspartame/Fructose Sweetened
Reduced Calorie White Cake
$GDL/KHCO_3$ vs. Double Action Baking Powder

| Ingredient | $GDL/HKCO_3$ | | Double Action Baking Powder | |
| --- | --- | --- | --- | --- |
| | grams | percent | grams | percent |
| Aspartame | 0.400 | 0.085 | 0.400 | 0.085 |
| Pure Crystalline Fructose | 60.0 | 12.78 | 60.0 | 12.78 |
| High Ratio Bleached Flour | 195.0 | 41.52 | 195.0 | 41.52 |
| N-Flate | 38.8 | 8.26 | 38.8 | 8.26 |
| Egg White Solids | 20.3 | 4.32 | 20.3 | 4.32 |
| Vanilla Powder | 2.7 | 0.57 | 2.7 | 0.57 |
| Polydextrose | 80.0 | 17.04 | 80.0 | 17.04 |
| Solka Floc | 63.6 | 13.54 | 63.6 | 13.54 |
| Glucono Delta Lactone | 6.0 | 1.28 | — | — |
| Potassium Bicarbonate | 2.8 | 0.60 | — | — |
| Double Action Baking Powder | — | — | 8.8 | 1.87 |
| Water | 370.0 | — | 370.0 | — |
| Apparent Total Sweetness Index | 170.0 | | 170.0 | |
| Perceived Relative Sweetness | Isosweet (Acceptable) | | Less than isosweet (not acceptable) | |
| Aspartame Recovery per Cake, grams | 0.3202 | | 0.2262 | |
| Aspartame Recovery, % | 80.0 | | 56.6 | |
| Computed Total Sweetness Index (based upon aspartame recovery) | 154.0 | | 135.0 | |
| Batter pH, as is | 6.71 | | 7.24 | |
| Baked pH (50/50, $H_2O$) | 5.29 | | 6.22 | |
| Rise, inches | 1.75 (acceptable) | | 1.62 (acceptable) | |
| Texture | good | | good | |
| Crust Color | light golden brown | | light golden brown | |
| Taste | good mouthfeel and sweetness | | good mouthfeel and poor sweetness | |

Table IV sets forth formulations for fructose/aspartame sweetened low calorie cakes which are identical in every respect except leavening systems. The aspartame recovery from the $GDL/KHCO_3$ leavened cake was about 80% while that of the double action baking powder leavened cake was about 56.6%. This is evidence of a strong stabilizing effect of GDL on aspartame during baking conditions.

TABLE V

Aspartame Sweetened
Reduced Calorie White Cake
GDL/KHCO3 vs. Double Action Baking Powder

| Ingredient | GDL/KHCO3 gram | GDL/KHCO3 percent | Double Action Baking Powder grams | Double Action Baking Powder percent |
|---|---|---|---|---|
| Aspartame | 0.900 | 0.191 | 0.900 | 0.191 |
| High Ratio Bleached Cake Flour | 199.2 | 42.37 | 199.2 | 42.37 |
| N-Flate | 40.0 | 8.51 | 40.0 | 8.51 |
| Egg White Solids | 20.3 | 4.32 | 20.3 | 4.32 |
| Vanilla Powder | 2.7 | 0.57 | 2.7 | 0.57 |
| Polydextrose | 125.0 | 26.59 | 125.0 | 26.59 |
| Solka Floc | 73.2 | 15.57 | 73.2 | 15.57 |
| Glucono Delta Lactone | 6.0 | 1.28 | — | — |
| Potassium Bicarbonate | 2.8 | 0.60 | — | — |
| Double Action Baking Powder | — | — | 8.8 | 1.87 |
| Water | 380.0 | — | 380.0 | — |
| Apparent Total Sweetness Index | 180.0 | | 180.0 | |
| Perceived Relative Sweetness | approx. isosweet (acceptable) | | less than issosweet (not acceptable) | |
| Aspartame Recovery per Cake, grams | 0.7366 | | 0.6268 | |
| Aspartame Recovery, % | 81.8 | | 69.6 | |
| Computed Total Sweetness Index (based upon aspartame recovery) | 147.0 | | 125.0 | |
| Batter pH, as is | 6.59 | | 6.75 | |
| Baked pH (50/50, H2O) | 5.10 | | 6.14 | |
| Rise, inches | 1.62 (acceptable) | | 1.75 (acceptable) | |
| Texture | Fair-tends to crumble | | Fair-tends to crumble | |
| Crust Color | Almost white (poor) | | Almost white (poor) | |
| Taste | Poor - gritty with bitter aftertaste | | Poor - gritty with bitter aftertaste | |

Table V sets forth formulations for solely aspartame sweetened low calorie cakes which are identical in every aspect except leavening systems. The aspartame recovery from the GDL/KHCO3 leavened cake was about 81.8% while that of the double action action baking powder leavened cake was about 69.6%. Again, this is further evidence of the stabilizing effect of GDL.

Organoleptic results for each respective cake—compared to the computed total Sweetness Indices (based upon aspartame recovery)—support the analytical data. Organoleptically, the GDL/KHCO3 leavened aspartame/fructose and aspartame sweetened cakes were judged to be about isosweet to the white cake control of Table II. The cakes had similar computed total Sweetness Indices—154 and 147, respectively. Organoleptically, the GDL/KHCO3 leavened fructose/aspartame sweetened cake was judged to be sweeter than the double action baking powder counterpart. This was confirmed by the respective computed total Sweetness Indices of 154 and 135. Organoleptically, the GDL/KHCO3 leavened aspartame sweetened cake was judged to be sweeter than the double action baking powder counterpart. This was confirmed by the respective computed total Sweetness Indices of 147 and 125.

The mechanism by which GDL stabilizes aspartame is thought to relate to improved control of pH during the baking process; however, the exact mechanism is not known. Aspartame is far less stable in heated aqueous solutions at pH6 and pH7 than at a pH level of about 5. As shown in Tables IV and V, the batter pH of double action baking powder leavened cakes is about 7, while the baked cake pH is about 6. Alternatively, the batter pH of the GDL leavened cakes is about 6.6 while the baked cake pH is about 5.2. Based upon aspartame recovery and the preceding observed synergisms, the foregoing data show a preferred range in which GDL stablizes aspartame. This range encompasses GDL:aspartame weight ratios of about 2 to about 17 on dry basis. With respect to approximate isosweetness, the preferred ratio of GDL:aspartame for the fructose/aspartame sweetened baked products is about 8 to about 17, again on a dry basis. With respect to approximate isosweetness, the preferred ratio of GDL:aspartame for the solely aspartame sweetened baked product is about 6.5 to about 7.5 based on the dry weight. Depending on the relative sweetness and the ratio of aspartame:nutritive sweeteners, the ratio of GDL:aspartame could be much higher than about 17.

TABLE VI

| | Aspartame Recovery | | | |
|---|---|---|---|---|
| | Cake 2 | Cake 3 | Cake 4 | Cake 5 |
| Aspartame Added per Cake, mg | 400.0 | 400.0 | 900.0 | 900.0 |
| Aspartame Recovered per Cake, mg | 314.4 | 227.6 | 701.1 | 568.8 |
| | 326.0 | 224.8 | 772.2 | 6849. |
| $\overline{X} =$ | 320.2 | 226.2 | 736.6 | 626.8 |
| Aspartame Recovery, % | 80.0 | 56.6 | 81.8 | 69.6 |
| Diketopiperazine per Cake, mg | 12.4 | 48.1 | 45.9 | 54.2 |
| | 13.1 | 56.4 | 57.4 | 74.0 |
| $\overline{X} =$ | 12.8(3.2%) | 52.2(13.0%) | 51.6(5.7%) | 64.1(7.1%) |
| Aspartylphenylalanine per Cake, mg | 16.9 | 22.2 | 26.8 | 34.8 |
| | 19.7 | 28.6 | 41.9 | 28.2 |
| $\overline{X} =$ | 18.3(4.6%) | 25.4(6.4%) | 34.4(3.8%) | 31.5(3.5%) |
| Phenylalanine per Cake, mg | 16.9 | 22.2 | 26.8 | 34.8 |
| | 19.3 | 31.2 | 42.6 | 28.2 |

TABLE VI-continued

| | Aspartame Recovery | | | |
|---|---|---|---|---|
| | Cake 2 | Cake 3 | Cake 4 | Cake 5 |
| | 18.1(4.5%) | 26.7(6.7%) | 34.7(3.9%) | 31.5(3.5%) |
| Remainder per Cake, mg | 30.6(7.5%) | 69.5(17.4%) | 42.7(4.7%) | 146.2(16.2%) |

Cake 2: glucono delta lactone/potassium bicarbonate leavened, with fructose.
Cake 3: double action baking powder leavened, with fructose.
Cake 4: glucono delta lactone/potassium bicarbonate leavened, without fructose.
Cake 5: double action baking powder leavened, without fructose.
(numbers in parentheses indicate the percentage of added aspartame)

Table VI above summarizes in more detail the aspartame recovery data for the noted cakes. The GDL-leavened, aspartame/fructose sweetened cake (Cake No. 2) produced the least amount of aspartame breakdown products (79.8 mg) and the least amount of individual breakdown products. Data from the GDL-leavened, aspartame/fructose sweetened cake (Cake No. 2) and the aspartame sweetened cake (Cake No. 4) indicated that about 81% of the added aspartame remained stable, about 4.5% of the added aspartame was converted to diketopiperazine, about 4.2% of the added aspartame was converted to aspartylphenylalanine, about 4.2% of the added aspartame was converted to phenylalanine an about 6% of the added aspartame was either not accounted for or was converted to compounds that were not detected. Table VI also shows that the levels of breakdown products expressed as a percentage of added aspartame are significantly higher for the double action baking powder leavened cakes with respect to diketopiperazine and the "remainder", providing further support for the role of GDL in stabilizing aspartame.

Other aspects important to the overall quality of a cake are rise, crust color and toughness, perceived taste and mouthfeel. Each cake in Tables V and VI was observed to have an acceptable rise. The fructose/aspartame sweetened cakes (GDL and baking powder) had good texture while the aspartame sweetened cakes (GDL and baking powder) had only fair texture with a tendency to crumble owing to larger pore size and a slightly coarse texture.

The improvement in texture in the fructose/aspartame sweetened cakes can be attributed to the presence of less bulking agents and the presence of fructose. As noted, the fructose/aspartame sweetened cakes (GDL and baking powder) had a light golden brown crust which was pleasing to the eye with no toughness, while each cake sweetened solely with aspartame had a pale, almost white crust which is not common to ordinary white cakes. The light golden crust may be attributed to the fructose because of the Maillard browning reaction between fructose and the flour protein. The GDL leavened fructose/aspartame cake exhibited both acceptable mouthfeel and sweetness while the baking powder leavened fructose/aspartame cake exhibited acceptable mouthfeel and poor sweetness. Alternatively, both solely aspartame sweetened cakes had poor mouthfeel (gritty), aftertastes and in the case of the baking powder leavened aspartame cake, off-flavors. The improved mouthfeel of the fructose/aspartame cakes can be attributed to less bulking agents and the presence of fructose. The aftertastes and off-flavors may be attributed to higher absolute levels of certain aspartame breakdown products (due to required higher aspartame levels to achieve proper sweetness) or other causes which are not known.

Thus, fructose is a major contributor to the overall eating quality of the cake and its presence results in improved texture, crust color, mouthfeel and potentially eliminates undesirable aftertastes or off-flavors.

Both the GDL leavened fructose/aspartame and aspartame sweetened cakes meet the criteria of a low calorie (50% calorie reduced) product relative to USDA Handbook #8 having caloric values of about 187 and about 163 calories per 100 grams baked cake respectively.

TABLE VII

Selection of Polydextrose/Solka-Floc Ratio
White Cakes

| Constants, each cake, grams: | |
|---|---|
| Aspartame | 0.40 |
| Pure Crystalline Fructose | 60.0 |
| High Ratio Bleached Cake Flour | 195.0 |
| N-Flate | 38.8 |
| Egg White Solids | 20.3 |
| Glucono Delta Lactone | 6.0 |
| Potassium Bicarbonate | 2.8 |
| Vanilla Powder | 2.7 |
| Water | 370.0 |

| | Cake Number | | | | | | |
|---|---|---|---|---|---|---|---|
| Variables (grams): | 1 | 2 | 3 | 4 | 5 | 6 | 7 |
| Polydextrose (PD) | 100.5 | 93.3 | 86.2 | 80.0 | 71.8 | 63.6 | 57.4 |
| Solka Floc (SF) | 43.1 | 50.3 | 57.4 | 63.6 | 71.8 | 80.0 | 86.2 |
| Ratio PD/SF | 2.33 | 1.85 | 1.50 | 1.26 | 1.00 | 0.80 | 0.67 |
| Texture | coarse | slightly coarse | good | good | slightly dense | dense | dense |
| Mouthfeel | gritty | slightly gritty | acct. | acct. | slightly gummy | gummy | gummy |
| Moistness | dry | acct. | acct. | acct. | dry | dry | dry |
| Crust | soft | soft | soft | soft | hard | hard | hard |

Table VII illustrates the effect of varying ratios of the bulking agents polydextrose and Solka-Floc on the quality (texture, mouthfeel, moistness, crust) of a fructose/aspartame sweetened cake. As shown, the preferred weight ratio of polydextrose:Solka-Floc is between about 1.00 and about 1.85; the best quality is obtained when the weight ratios are in the range of about 1.26 to about 1.50. As these ratios are exceeded, the texture tends to become coarse and mouthfeel becomes gritty. Lower ratios, on the other hand, tend to produce dense texture, gummy mouthfeel, a dry product and a hard crust.

TABLE VIII

Fructose/Aspartame Sweetened Reduced Calorie Lemon Cookie

| Ingredient | grams | |
|---|---|---|
| | GDL/KHCO$_3$ | Double Action Baking Powder |
| Aspartame | 0.23 | 0.23 |
| Pure Crystalline Fructose | 49.0 | 49.0 |
| Polydextrose | 65.2 | 65.2 |
| Solka Floc | 37.2 | 37.2 |
| N-Flate | 18.0 | 18.0 |
| Vegetable Shortening | 20.0 | 20.0 |
| Egg White Solids | 12.0 | 12.0 |
| Vanilla Powder | 1.5 | 1.5 |
| Lemon Extract | 1.5 | 1.5 |
| General Purpose Flour | 94.9 | 94.9 |
| Glucono Delta Lactone | 4.0 | — |
| Potassium Bicarbonate | 1.8 | — |
| Double Action Baking Powder | — | 5.8 |
| Water | 85.0 | 85.0 |

Directions:
Combine aspartame, pure crystalline fructose, polydextrose, Solka-Floc, N-Flate, shortening and egg white solids. Beat at moderate speed to a cream-like texture. Add leavening agents, vanilla powder, lemon extract and water. Cream until ingredients are blended and wetted. Gently fold in flour. Roll out dough to about ¼-inch thickness. Cut cookies to about a 2-inch diameter and bake on cookie sheets at 350° for about 5 to 6 minutes.

The heat stabilization of aspartame by GDL and the sweetness synergism is also applicable to other food products. For example, Table VIII sets forth the applicability of this discovery to a lemon flavored cookie. Table VIII gives formulations for cookies sweetened with fructose and aspartame and leavened alternatively with GDL/KHCO$_3$ or double action baking powder. In all other respects the cookie formulas are identical.

The cookies were prepared and baked according to the directions stated in Table VIII at 350° F. for about 5 to 6 minutes. The rise of the GDL and baking powder leavened cookies was judged acceptable. It was noted that the baking powder leavened cookie had a less dense texture. Organoleptic evaluation indicated that the GDL leavened cookie was sweeter than the baking powder leavened cookie. This again shows that GDL contributes to the stabilization of aspartame in the baking process and also contributes to the previously noted sweetness synergism. The pH of the baked cookies (50/50 with water) was noted to be 5.33 and 6.18, respectively, for the GDL and baking powder leavened cookies. Hence, sweetness synergism and aspartame stability are not limited to only cake-type products.

Although the foregoing research discloses the use of fructose in combination with aspartame as the sweetening system for baked products, the use of other full calorie sweeteners in lieu of fructose is possible. The use of other polyhydric alcohols such as sucrose, dextrose, xylitol, etc. as an element of the sweetening system in combination with aspartame will be acceptable in most contexts and will not adversely affect the heat stability of aspartame in combination with GDL.

TABLE IX

Fructose/Aspartame V. Sucrose/Aspartame Sweetened White Cakes

| Ingredient | grams | |
|---|---|---|
| | Fructose | Sucrose |
| Aspartame | 0.40 | 0.40 |
| Pure Crystalline Fructose | 60.0 | — |
| Sucrose | — | 60.0 |
| High Ratio Bleached Flour | 195.0 | 195.0 |
| N-Flate | 38.8 | 38.8 |
| Egg White Solids | 20.3 | 20.3 |
| Glucono Delta Lactone | 6.0 | 6.0 |
| Potassium Bicarbonate | 2.8 | 2.8 |
| Vanilla Powder | 2.7 | 2.7 |
| Polydextrose | 80.0 | 80.0 |
| Solka-Floc | 63.6 | 63.6 |
| Water | 370.0 | 370.0 |

Cake No. 2 in Table IX contains a sucrose/aspartame sweetening system. We prepared and evaluated Cake No. 2 organoleptically to determine the effects of using sucrose in place of fructose as the polyhydric alocohol sweetener in combination with aspartame. Each cake was observed to have similar rise and texture, but the cake containing sucrose was judged to be noticeably less sweet (hyposweet) compared to the cake containing fructose. Although neither cake exhibited an unpleasant aftertaste, the fructose cake had the preferred flavor.

The superior sweetness of the fructose cake could be attributed to a number of factors. Fructose is, in some applications, sweeter than sucrose. Fructose may contribute more to the synergistic effect noted previously. In addition, the preferred flavor of the fructose cake may be the result of the known ability of fructose to enhance certain flavors.

These observations do not, however, mean that sucrose or other polyhydric alcohols (such as sorbitol or xylitol) could not be used in combination with aspartame as the sweetening system for baked products with GDL in which about 50% of the sweetener is derived from aspartame. The hyposweetness noted in Cake No. 2, Table IX can be eliminated, for example, by a slight increase in the aspartame or sucrose levels. Although products sweetened with aspartame and polyhydric alcohols such as sucrose, or the like, may have acceptable sweetness levels and other qualities, these products would not have the same advantages from a reduced calorie and metabolic perspective as those products utilizing fructose.

Although our initial research involved the heat stabilization of aspartame in baked applications, the concept is applicable in other aqueous contexts in which aspartame was subjected to elevated temperatures. We combined 0.25 grams of aspartame with 6.5 grams of GDL and diluted to 500 ml with deionized water. The initial pH of the resulting solution was about 3.3. A portion of the solution was stored at about 120° F. for 24 hours. The remainder of the solution was stored at about 70° F. for 24 hours. Following the storage period, the pH of each solution was about 2.5.

We then added a grapefruit flavor (0.14 g) to 250 ml of each stored portion to facilitate organoleptic testing. Organoleptic analysis did not detect any difference in sweetness between the parent and heated samples. These results demonstrate that aspartame remained stable during the storage period at elevated temperatures. Under similar pH storage conditions of aspartame alone, a loss of about 8% of aspartame has been previously reported. Hence, the heat stabilization of aspartame by a sugar acid lactone is applicable to any context in which aspartame or other dipeptide sweeteners can be used.

The foregoing general discussion and experimental examples are intended to be illustrative of the present invention, and are not to be considered as limiting. Other variations within the spirit and scope of this invention are possible and will present themselves to those skilled in the art.

We claim:

1. A sweetening composition which consists essentially of a dipeptide sweetener and a heat stabilizing amount of a sugar acid lactone which limits the decomposition of said dipeptide sweetener at baking temperatures to no more than about 20%.

2. The sweetening composition of claim 1 wherein the weight ratio of sugar acid lactone:dipeptide sweetener is about 2 to about 20, based on the dry weights thereof.

3. The sweetening composition of claim 1 wherein the weight ratio of sugar acid lactone:dipeptide sweetener is about 6.5 to about 7.5, based on the dry weights thereof.

4. A sweetening composition which consists essentially of a dipeptide sweetener which is an aspartyl phenylalanine alkyl ester containing up to four atoms, inclusive, in the alkyl moiety thereof, and a heat stabilizing amount of a sugar acid lactone which limits the decomposition of said dipeptide sweetener at baking temperatures to no more than about 20%.

5. The sweetening composition of claim 4 wherein the dipeptide sweetener is aspartame.

6. The sweetening composition of claim 4 wherein the sugar acid lactone is glucono delta lactone.

7. The sweetening composition of claim 4 wherein the dipeptide sweetener is aspartame and the sugar acid lactone is glucono delta lactone.

8. The sweetening composition of claim 7 wherein the weight ratio of glucono delta lactone:aspartame is about 2 to about 20, based on the dry weights thereof.

9. The sweetening composition of claim 7 wherein the weight ratio of glucono delta lactone:aspartame is about 6.5 to about 7.5, based on the dry weights thereof.

10. A sweetening composition suitable for a baked product which consists essentially of a dipeptide sweetener, a heat stabilizing amount of a sugar acid lactone which limits the decomposition of the dipeptide sweetener at baking temperatures to no more than about 20% and a physiologically acceptable polyhydric alcohol having a relative sweetness as compared to sucrose of at least 0.3.

11. The sweetening composition of claim 10 wherein the dipeptide sweetener is an aspartyl phenylalanine alkyl ester having up to 4 carbon atoms, inclusive, in the alkyl moiety thereof.

12. The sweetener composition of claim 11 wherein the dipeptide sweetener is aspartame.

13. The sweetening composition of claim 12 wherein the sugar acid lactone is glucono delta lactone and the polyhydric alcohol is fructose.

14. The sweetening composition of claim 13 wherein the weight ratio of glucono delta lactone:aspartame is between about 2 to 20 based on the dry weights thereof.

15. The sweetening composition of claim 13 wherein the weight ratio of glucono delta lactone:aspartame is about 8 to about 17 based on the dry weights thereof.

16. The sweetening composition of claim 13 wherein the weight ratio of glucono delta lactone:fructose is about 0.03 to about 0.15 based on the dry weights thereof.

17. The sweetening composition of claim 13 wherein the weight ratio of glucono delta lactone:fructose is about 0.06 to about 0.10 based on the dry weights thereof.

18. The sweetening composition of claim 13 wherein the weight ratio of fructose:aspartame is about 115 to about 220 based on the dry weights thereof.

19. The sweetening composition of claim 13 wherein the weight ratio of fructose:aspartame is about 115 to about 185 based on the dry weights thereof.

20. The sweetening composition of claim 13 wherein the weight ratio of fructose:aspartame is about 130 to about 160 based on the dry weights thereof.

21. The sweetening composition of claim 10 wherein the sugar acid lactone is glucono delta lactone.

22. The sweetening composition of claim 10 wherein the polyhydric alcohol is fructose.

23. The sweetening composition of claim 10 wherein the polyhydric alcohol is sucrose.

24. A mix for baked food products with acceptable taste and eating quality comprising:
   flour;
   a leavening agent;
   a bulking agent; and
   a sweetening agent;
said sweetening agent including a dipeptide sweetener and a heat-stabilizing amount of a sugar acid lactone which limits the decomposition of said dipeptide sweetener at baking temperatures to no more than about 20%, in a weight ratio of about 2 to about 20 based on teh dry weights of said dipeptide and said lactone.

25. The mix of claim 24 wherein the dipeptide sweetener is an aspartyl phenylalanine alkyl ester containing up to 4 carbon atoms, inclusive, in the alkyl moiety thereof.

26. The mix of claim 25 wherein the sugar acid lactone is glucono delta lactone.

27. The mix of claim 24 wherein the dipeptide sweetener is aspartame.

28. The mix of claim 24 wherein the sugar acid lactone is glucono delta lactone.

29. The mix of claim 24 wherein the food product is a cake.

30. The mix of claim 24 wherein the mix is further characterized by having relatively low sodium and relatively low cholesterol levels.

31. A mix for baked food products with acceptable taste and eating quality comprising:
   flour;
   a leavening agent; and
   a sweetening agent;
said sweetening agent including a dipeptide sweetener and a heat-stabilizing amount of a sugar acid lactone which limits the decomposition of said dipeptide sweetener at baking temperature to no more than about 20%, a sugar acid lactone and a physiologically acceptable polyhydric alcohol having a relative sweetness as compared to sucrose of at least about 0.3 wherein the dry weight ratio of the sugar acid lactone:dipeptide sweetener is between about 2 and about 20.

32. The dietetic baked product mix of claim 31 wherein the dry weight ratio of the sugar acid lactone:dipeptide sweetener is about 8 to about 17.

33. The dietetic baked product mix of claim 31 wherein the dipeptide sweetener which is an aspartyl phenylalanine alkyl ester containing up to 4 carbon atoms, inclusive, in the alkyl moiety thereof.

34. The mix of claim 33 wherein the dipeptide sweetener is aspartame.

35. The mix of claim 33 wherein the sugar acid lactone is glucono delta lactone.

36. The mix of claim 33 wherein the polyhydric alcohol is fructose.

37. The mix of claim 33 wherein the polyhydric alcohol is sucrose.

38. The mix of claim 31 additionally including polydextrose and powdered cellulose fiber.

39. The mix of claim 38 wherein the ratio of polydextrose: powdered cellulose fiber is between about 1.0 to about 2.0.

40. The mix of claim 31 wherein the ratio of sugar acid lactone:polyhydric alcohol is about 0.03 to about 0.15 based on the dry weights thereof.

41. The mix of claim 40 which is characterized by a low sodium level and a low cholesterol level.

42. The mix of claim 31 wherein the ratio of sugar acid lactone:polyhydric alcohol is about 0.06 to about 0.10 based on the dry weights thereof.

43. The mix of claim 31 wherein the ratio of polyhydric alcohol:dipeptide sweetener is about 115 to about 220 based on the dry weights thereof.

44. The mix of claim 31 wherein the sweetening agent comprises aspartame, a heat stabilizing amount of glucono delta lactone and fructose, and wherein the dry weight ratio of fructose:aspartame is about 130 to about 160.

45. A method for imparting heat stability to a dipeptide sweetener which consists essentially of combining an effective amount of a sugar acid lactone with a dipeptide sweetener to limit the decomposition of said dipeptide sweetener at baking temperatures to no more than about 20%.

46. The method of claim 45 wherein the dipeptide sweetener is aspartame and the sugar acid lactone is glucono delta lactone.

47. The method of claim 46 wherein glucono delta lactone and aspartame are combined in a weight ratio of about 2 to about 20, based on the dry weights thereof.

48. A method for making a dietetic cake comprising the steps of:
combining about 0.4 grams of aspartame, about 60 grams of fructose, about 195 grams of flour, about 39 grams of a balanced blend of emulsifiers, modified food starch and guar gum, 20 grams of egg white solids, about 6 grams of glucono delta lactone, about 3 grams of potassium bicarbonate, about 2.7 grams of vanilla, about 80 grams of polydextrose, about 64 grams of powdered cellulose fiber;
stirring the resulting combination of dry ingredients to produce a substantially homogeneous, dry mass;
combining the produced dry mass with about 370 grams of water;
whipping the resulting mixture at a relatively low speed for approximately 30 seconds and then at a relatively high speed for approximately 5 minutes to produce a batter;
transferring the batter to a lightly greased, floured pan; and
baking the batter at a temperature of about 325° F. for a time period of about one-half hour.

49. A method for making a dietetic cake comprising the steps of:
combining about 0.90 grams of aspartame, about 199 grams of flour, about 40 grams of a balanced blend of emulsifiers, modified food starch and guar gum, about 20 grams of egg white solids, and about 6 grams of glucono delta lactone, about 2.8 grams of potassium bicarbonate, about 2.7 grams of vanilla powder, about 125 grams of polydextrose and about 73 grams of powdered cellulose fiber;
stirring the resulting combination of dry ingredients to produce a substantially homogeneous, dry mass;
combining the produced dry mass with about 380 grams of water;
whipping the resulting mixture at a relatively low speed for approximately 30 seconds and then at a relatively high speed for approximately 5 minutes to produce a batter;
transferring the batter to a lightly greased, floured pan; and baking the batter at a temperature of about 325° F. for a time period of about one-half hour.

* * * * *